Aug. 18, 1931. P. T. WOODLAND 1,819,631
CORN HARVESTING MACHINE
Filed Feb. 16, 1929 2 Sheets-Sheet 1
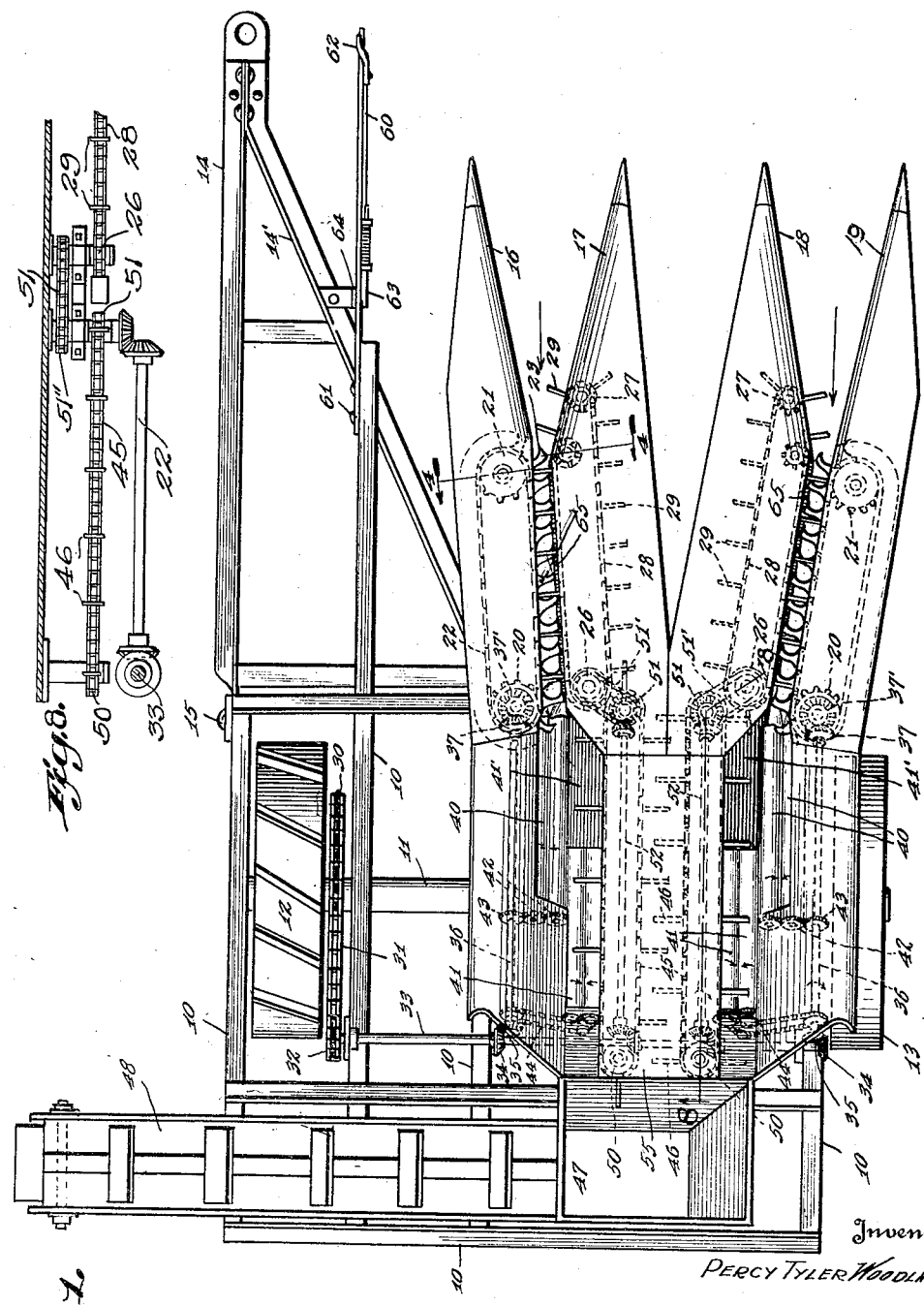
Inventor
PERCY TYLER WOODLAND,
By James A. Walsh
Attorney

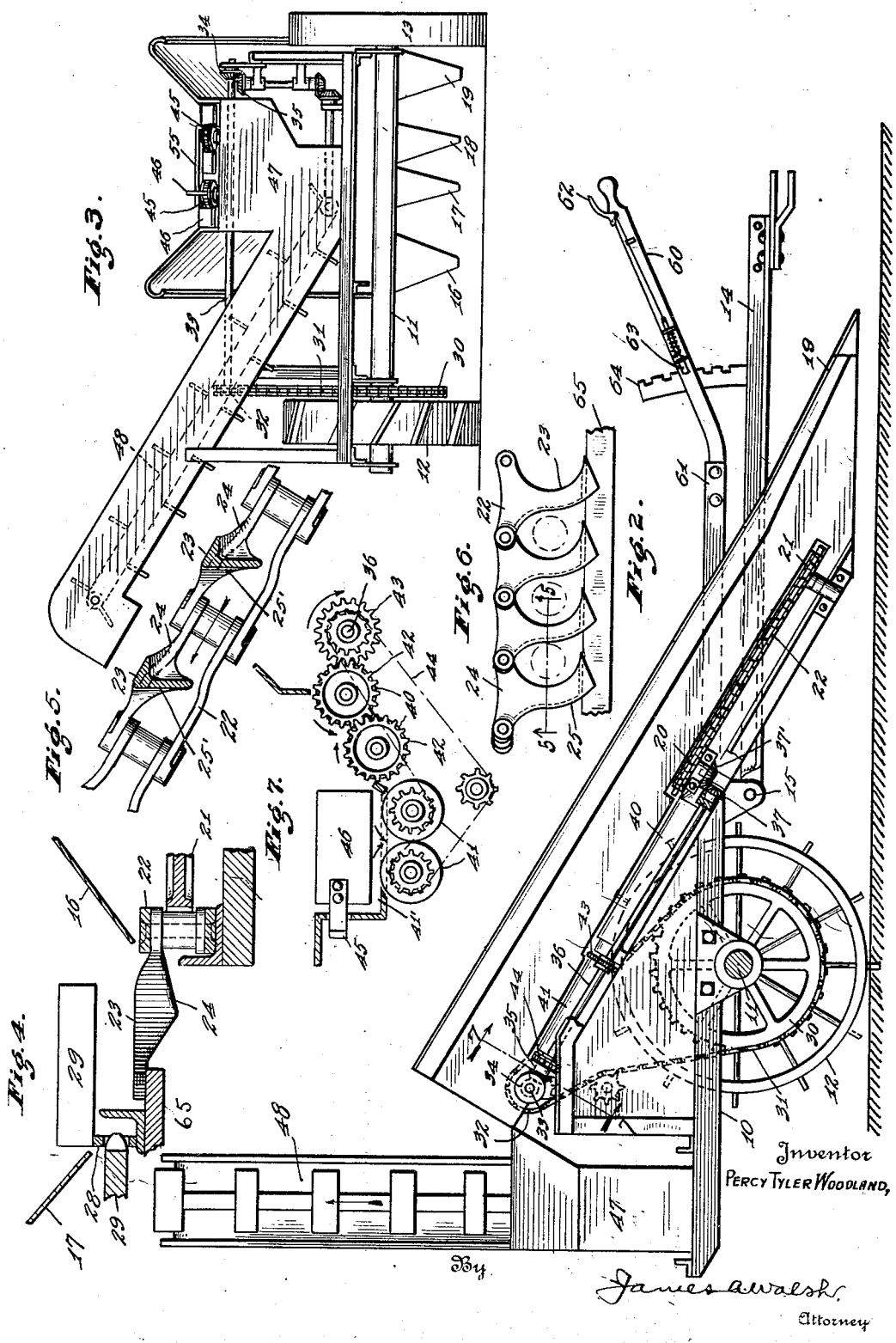

Patented Aug. 18, 1931

1,819,631

UNITED STATES PATENT OFFICE

PERCY TYLER WOODLAND, OF GRAHAMSTOWN, SOUTH AFRICA

CORN HARVESTING MACHINE

Application filed February 16, 1929, Serial No. 340,547, and in South Africa May 8, 1928.

My invention relates to corn harvesting machines of the type designed to be drawn through the crop rows to gather and maintain the stalks in substantially upright position, strip the lower ears from the standing stalks, snap the upper or remaining ears from the stalks, husk the ears, and discharge the cleaned ears, stalks and débris from the machine, as will be hereinafter more particularly described, my object being to provide a machine capable of operation upon one or more rows of standing corn in a highly efficient manner and which is of a comparatively compact and wieldy construction, and by its adjustability vertically is capable of stripping ears close to the ground where the stalk crop is unduly short or in stunted condition, as well as lifting fallen stalks and conveying them to the machine to remove and husk the ears thereof.

In the accompanying drawings, forming part hereof, Figure 1 is a plan view of the machine; Fig. 2, a side elevation with the near wheel removed; Fig. 3, a rear view; Fig. 4, a section through the gathering and stripping chains, taken on the dotted line 4—4 in Fig. 1; Fig. 5 is a section on line 5—5 of Fig. 6 showing a portion of the links forming the stripping chain, at substantially the incline in which the chain is positioned and travels on the machine; Fig. 6, a plan view of a portion of the links of the stripping chain showing the shape of the stripping fingers; Fig. 7 is a section through the snapping and husking rolls and the conveyor, taken on the dotted line 7—7 in Fig. 2; and Fig. 8 is a section taken on the dotted line 8—8 in Fig. 1.

In the drawings, the numeral 10 indicates the frame of the machine, which is supported on the axle 11 of the road wheels, 12 and 13, a tractor draw-bar comprising the members 14 and 14' being pivotally connected, at 15, to the frame parts 10. Upon the frame, in any suitable manner, I mount guards 16, 17, which are inclined and separated and terminate in points, as indicated in the drawings, which form a V-shaped entrance for receiving and guiding corn stalks as the machine travels through the rows in the field, and in similar manner I provide like guards, 18, 19, so that the machine which I have chosen to illustrate is capable of handling two rows of stalks during harvesting operations, but I may reduce or increase the number of guards and complementary equipment for accomplishing lesser or increased results, as will be readily understood.

In guards 16 and 19 I provide sprockets 20 and 21 connecting chains 22 which are equipped with substantially concavo-convex stripping fingers 23 of the character shown in Fig. 6, each such finger embodying a base 24 and a curved member 25, the rear or convex wall 25' of the finger assuming a vertical position parallel to the stalk it engages as the stripping chain travels upwardly and rearwardly, the concave portion of one finger and the convex portion of the succeeding finger forming an opening into which a stalk enters as indicated by the dotted lines in Fig. 6 and about which the fingers slide and strip ears from the stalks as the machine is moving, the fingers in their travel rearwardly being sustained by a rail 65 forming part of guards 17 and 18. In each of the guards 17 and 18 sprockets 26, 27, are connected by chains 28 carrying gathering fingers 29 which are preferably above and cooperate with the stripping fingers 23 in gathering the stalks into the entrance between the guides and propelling the ears and other material upwardly between the inclined spaced guards.

My improved machine is preferably drawn by a tractor, and the mechanisms of the machine are actuated from a bull-wheel 12, to which (or the axle supporting the same) the sprocket 30 is secured and which latter is connected by a chain 31 to a sprocket 32 on shaft 33. Said shaft 33 carries bevel gears 34 which mesh with bevel gears 35 on shaft 36, the opposite ends of said shafts having bevel gears 37 thereon meshing with gears 37' which drive sprockets 20, by which means the chains 22 carrying the stripping fingers 23 are actuated. In operation, the ears and stalks are delivered by the gathering fingers 29 and stripping fingers 23 to snapping rolls 40 which remove the ears attached to stalks and deliver them laterally, together with the ears which have been removed by the stripping fingers, to husking rolls 41 forming part of the bottom of a receiving trough 41'. These rolls 41 lie parallel with the snapping rolls and extend rearwardly in relation thereto, and by which rolls 41 the husks attached to the ears are removed, the husks together with the crushed stalks and débris passing through the respective pairs of snapping and husking rolls and discharging therefrom upon the ground.

The snapping rolls 40 are rotated by gears 42 driven by gear 43 on shaft 36, and the husking rolls 41 are rotated by a sprocket-and-chain system 44 driven from said shaft 36. As the ears are being discharged from the snapping rolls 40 to the horizontal husking rolls 41, the snapping rolls being in longitudinal and angular relation to the husking rolls, the ears are swept rearwardly along the husking rolls by means of the traveling chain 45 carrying blades 46, constituting a sweep, which blades propel the husked ears from the husking rolls into a hopper 47 from whence they are conveyed by an elevator 48 and discharged into vehicles or otherwise. These chains 45 are connected to sprockets 50, 51, and are actuated by a shaft 52 driven by shaft 33 through the bevel gears as shown, the opposite end of the shaft being geared to sprocket 51, which latter drives sprocket 51'' which in turn is connected to sprocket 26 by chain 51', as indicated in Fig. 8, so that through said shaft 52 both the chains 45 and 28 are driven to accomplish the operation already described. It will be understood that the two sets of snapping and husking rolls, gearing and other details of construction associated therewith are similar, and that the reference characters applied to the various elements of one set indicate like parts in the companion set, and also that shafts 52 and propelling chains 45 are enclosed by a cover or plate 55.

According to ground conditions, height of crop or other circumstances, it is important that the gathering, stripping and husking mechanisms be capable of raising and lowering at the forward portion of the machine, and in order to adjust the machine as desired I provide a lever 60, connected to the framework at 61, the lever embodying a handle 62 and a locking-pin 63 adapted to engage a rack 64 supported upon the frame. By manipulating the lever, in a manner well known, the guards and equipment supported thereby are raised and lowered at their forward ends as desired, and, as the draw-bar 14 is flexibly connected to a tractor (not shown) and its rear end pivoted to the frame of the machine, the draw-bar will readily follow such adjusting means.

In field operations it will be understood that as the machine is traveling the guard entrances will receive and guide standing corn stalks, and as the gathering and stripping fingers are moving rearwardly and upwardly as indicated by the arrows in Fig. 1, the stripping fingers 23 will become separated as they are turning about the lower sprockets 21 so that there will be an opening between the adjacent fingers sufficient in size to receive a stalk, and the forward movement of the machine, as well as the upward travel of the fingers, will cause the fingers to close about and hold the stalk in substantially normal upright position. During such movement these fingers are rapidly climbing up the stalks and stripping the ears from the lower portions thereof and coacting with gathering finger 29 to deliver the stripped ears into trough 41', which action completes the picking operation of removing the ears from the lower portions of the stalks, the delivery of the stalk to the snapping rolls being simultaneously assisted by the gathering chains. When an ear does not pull off from a stalk after being contacted by the stripping fingers the ear with the stalk as a whole is either pulled from the ground or the stalk is broken off, so that the stalk or part of it with the ears attached will be conveyed to the snapping rolls, by which rolls the ears are effectually removed from the stalk, the stalks passing between the snapping rolls, while the ears, because of the inclined relation of the snapping to the husking rolls, are instantly transferred to the latter to be husked and delivered from the machine, as hereinbefore explained.

In the manner described I provide a comparatively compact and highly efficient machine for the purpose stated, and by employing the peculiarly curved stripping fingers which spread apart at the guard entrances to receive and then close around the stalks until such fingers have traveled up to sprocket 20 where they again separate to release the stalks, I am enabled to maintain each stalk in standing position while the operation of stripping ears therefrom by the stripping fingers is in progress, or remove the stalk as a whole or the ear bearing portion thereof from the ground to be conveyed by the stripping and gathering fingers to the snapping rolls where the ears are then removed, the ears then husked by the husking rolls and from thence delivered in cleaned condition to any suitable means as the hopper 47 and elevator 48 for ultimately conveying the same from the machine, the stalks, leaves, husks and débris passing between the pairs of snapping rolls 42 and husking rolls 41 to the ground as will be readily understood and as the forward ends of the guards may be readily adjusted to move close to the ground I am enabled to lift fallen stalks, and save the ears therefrom.

I claim as my invention:

1. In a corn harvesting machine, a frame, spaced guards supported on the frame and having divergent outer ends constituting a guiding entrance for receiving standing corn stalks, an endless chain in one of said guards carrying gathering fingers traveling through the space between the guards, an endless chain in the opposite guard member carrying concavo-convex stripping fingers traveling through the space between the guards and adapted to close about a stalk and maintain the latter in upright position to strip ears therefrom as the machine is moving, and means for actuating said chains to cooperate for the purpose stated.

2. In a corn harvesting machine, a frame, spaced guards supported on the frame and having divergent outer ends constituting a guiding entrance for receiving standing corn stalks, an endless chain in one of said guards carrying gathering fingers traveling through the space between the guards, an endless chain in the opposite guard member carrying concavo-convex stripping fingers traveling through the space between the guards and adapted to close about a stalk and maintain the latter in upright position to strip ears therefrom as the machine is moving, means for actuating said chains to cooperate for the purpose stated and snapping rolls adjacent the upper ends of said guards for receiving stalks therefrom and removing ears from the stalks.

3. In a corn harvesting machine, a frame, spaced guards supported on the frame and having divergent outer ends constituting a guiding entrance for receiving standing corn stalks, an endless chain in one of said guards carrying gathering fingers traveling through the space between the guards, an endless chain in the opposite guard member carrying concavo-convex stripping fingers traveling through the space between the guards and adapted to close about a stalk and maintain the latter in upright position to strip ears therefrom as the machine is moving, means for actuating said chains to cooperate for the purpose stated, snapping rolls adjacent the upper ends of said guards for receiving stalks therefrom and removing ears from the stalks, and husking rolls adjacent the snapping rolls for receiving the ears from the latter and removing the husks therefrom.

4. In a corn harvesting machine, a frame, spaced guards supported on the frame and having divergent outer ends constituting a guiding entrance for receiving standing corn stalks, an endless chain in one of said guards carrying gathering fingers traveling through the space between the guards, an endless chain in the opposite guard member carrying concavo-convex stripping fingers traveling through the space between the guards and adapted to close about a stalk and maintain the latter in upright position to strip ears therefrom as the machine is moving, means for actuating said chains to cooperate for the purpose stated, snapping rolls adjacent the upper ends of said guards for receiving stalks therefrom and removing ears from the stalks, husking rolls adjacent the snapping rolls for receiving the ears from the latter and removing the husks therefrom, and means for removing the ears from the said husking rolls to be conveyed from the machine.

5. In a corn harvesting machine, a frame, spaced guards supported on the frame and having divergent outer ends constituting a guiding entrance for receiving standing corn stalks, an endless chain in one of said guards carrying gathering fingers traveling through the space between the guards, an endless chain in the opposite guard member carrying concavo-convex stripping fingers traveling through the space between the guards and adapted to close about a stalk and maintain the latter in upright position to strip ears therefrom as the machine is moving, means for actuating said chains to cooperate for the purpose stated, snapping rolls adjacent the upper ends of said guards for receiving stalks therefrom and removing ears from the stalks, husking rolls adjacent the snapping rolls for receiving the ears from the latter and removing the husks therefrom, means for removing the ears from said husking rolls to be conveyed from the machine, and a hopper into which said ears are conveyed.

6. In a corn harvesting machine, a frame, spaced guards supported on the frame and having divergent outer ends constituting a guiding entrance for receiving standing corn stalks, an endless chain in one of said guards carrying gathering fingers traveling through the space between the guards, an endless chain in the opposite guard member carrying concavo-convex stripping fingers traveling through the space between the guards and adapted to close about a stalk and maintain the latter in upright position to strip ears therefrom as the machine is moving, means for actuating said chains to cooperate for the purpose stated, snapping rolls adjacent the upper ends of said guards for receiving stalks therefrom and removing ears from the stalks, husking rolls adjacent the snapping rolls for receiving the ears from the latter and removing the husks therefrom, means for removing the ears from said husking rolls to be conveyed from the machine, a hopper into which said ears are conveyed, and an elevator adjacent the hopper into which said ears are delivered and conveyed from the machine.

7. In a corn harvesting machine, a guard, and a chain supported by the guard and carrying stripping fingers curved rearwardly and outwardly in relation to the direction of travel of the chain.

8. In a corn harvesting machine, a guard, a sprocket adjacent the forward end of said guard, a sprocket in said guard positioned rearwardly of said first mentioned sprocket, a chain connecting said sprockets, stripping fingers on said chain curved in a rearward and outward direction in relation to the direction of travel of the chain, and means for actuating said chain whereby as the fingers travel about said forward sprocket they will spread apart to receive a corn stalk and then close around the same and when traveling about the rear sprocket will again spread apart to release said stalk.

9. In a corn harvesting machine, a guard, sprockets in said guard, an endless chain connecting said sprockets, concavo-convex stripping fingers on said chain having spaces between them for accommodating a corn stalk, and means for actuating said sprockets and chain whereby the fingers will spread to receive corn stalks and close around the same as the chain travels rearwardly and again spread to release such stalks.

10. In a corn harvesting machine, a spaced guard having a V-shaped entrance at its forward end, a chain having gathering fingers mounted in the guard, a chain having stripping fingers mounted in the guard, and means for actuating the chains whereby the stripping fingers remove ears from the stalks and the gathering fingers cooperate with the stripping fingers to propel stalks and other material rearwardly between the spaced guard members.

11. In a corn harvesting machine, a guard, a stripping chain mounted in said guard and embodying curved fingers to receive corn stalks and strip ears therefrom, and snapping rolls positioned in the rear of said chain for removing ears from stalks released from the chain.

12. In a corn harvesting machine, a guard, a stripping chain mounted on said guard embodying concavo-convex fingers adapted to engage a corn stalk.

13. In a corn harvesting machine, a guard, an ear stripping chain mounted on said guard embodying concavo-convex fingers, and means for actuating said chain rearwardly to present to and engage the convex side of said fingers with corn stalks.

14. In a corn harvesting machine, a guard embodying spaced members, a gathering chain on one of said members embodying fingers, a stripping chain on the opposite member embodying concavo-convex fingers, means upon which the outer ends of said stripping fingers travel, and means for actuating said chains to propel corn stalks rearwardly between the spaced guard.

15. In a corn harvesting machine, a guard embodying spaced members, a gathering chain on one of said members embodying fingers, a stripping chain on the opposite member embodying concavo-convex fingers, means upon which the outer ends of said stripping fingers travel, means for actuating said chains to propel corn stalks rearwardly between the spaced guard, and snapping rolls positioned rearwardly of said chains for receiving material conveyed thereto by said chains.

16. In a corn harvesting machine, a guard, a chain mounted on the guard embodying concavo-convex stripping fingers adapted to engage a corn stalk, and means upon which the fingers move as the chain is traveling.

In testimony whereof I affix my signature.

PERCY TYLER WOODLAND.